May 21, 1940.   J. C. FOX   2,201,164
DECOY
Filed Sept. 26, 1938
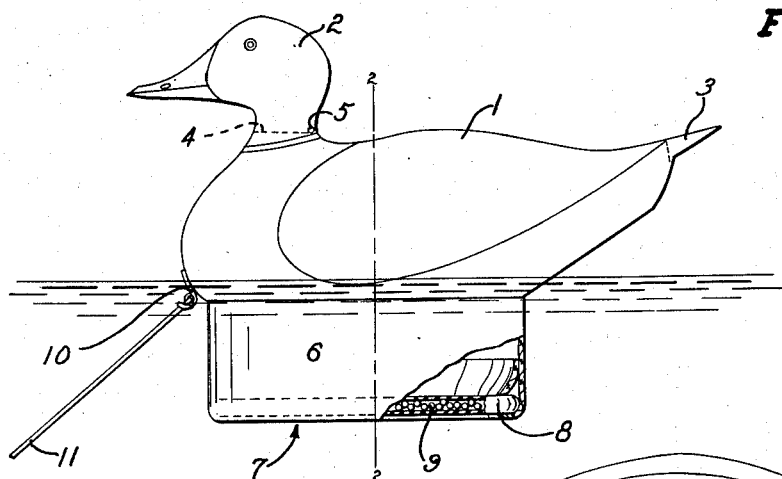
Fig. 1
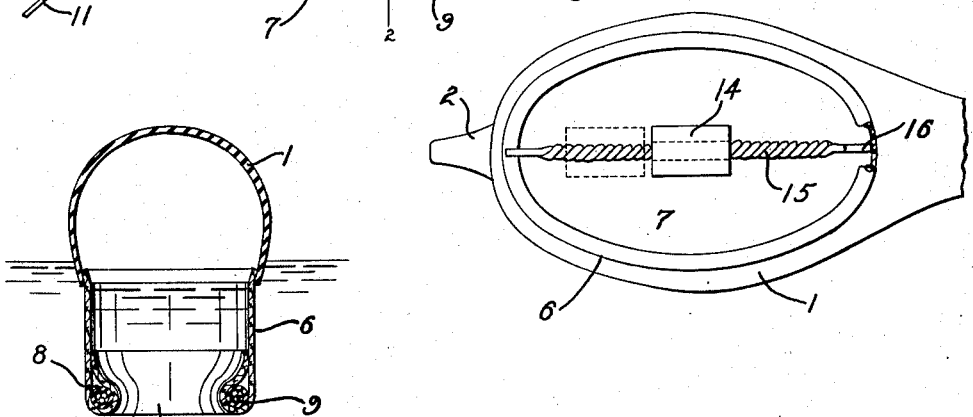
Fig. 4
Fig. 2
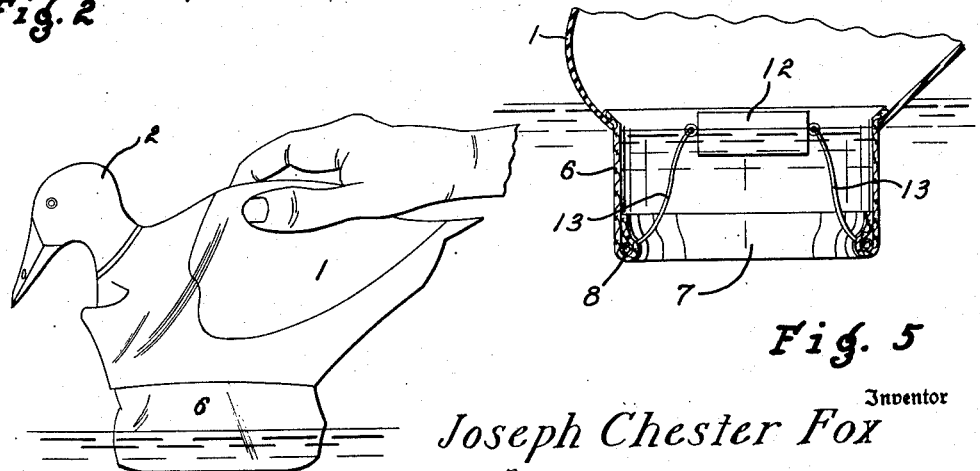
Fig. 5
Fig. 3
Inventor
Joseph Chester Fox
By
Charles L. Reynolds
Attorney Patented May 21, 1940

2,201,164

UNITED STATES PATENT OFFICE 2,201,164

DECOY

Joseph Chester Fox, Seattle, Wash.

Application September 26, 1938, Serial No. 231,673

12 Claims. (Cl. 43—3)

Buoyant decoys, such as ducks, have heretofore been made of various materials, but usually they are of wood or similar material, ballasted or formed to remain upright while floating, yet of considerable weight and bulk, or if printed or painted upon a flat surface they are supported upon a float, and while somewhat less bulky and of less weight than the wooden decoys, they are still bulky, rather fragile, and not very life-like in appearance. It is therefore a primary object of the present invention to provide a buoyant decoy which is light in weight, rugged, and capable of being collapsed to very small compass, and which will, when floating upon the water, assume, substantially automatically, a plump, life-like form, and float with proper appearance upon the water.

More specifically it is an object to provide a decoy composed substantially entirely of flexible and collapsible material, not inherently form-sustaining but hollow, so that it may be compacted for transportation, and with a bottom opening so that when set down upon the water it will trap air within it and thereby cause the body portion to be plumped out into lifelike form, and to float in natural position upon the water.

Among other objects are, to provide a decoy of the general type indicated, which will be stable upon the water, not subject to tilting or undue movement from wave or wind action; one in which the position of the decoy in the water may be adjusted when desired; and one which may be provided with auxiliary flotation means, so that if the hollow buoyant body is punctured, as by a shot, the material, though collapsed, will still be sustained on the surface, and can be recovered and repaired.

It is a further object to provide such a decoy which, by reason of its form and the material of which it is made, may readily be repaired, should leaks occur.

It is a further object to provide such a decoy which may be manufactured easily and relatively cheaply by known manufacturing processes, and which can therefore be sold at a low retail price, and which will prove serviceable and rugged in use.

With such objects in mind, and others as will appear later, my invention comprises the novel decoy, and the novel composition and arrangement of the several parts thereof, in relation to each other, as shown in the accompanying drawing, and as will be hereinafter more particularly disclosed and defined.

In the accompanying drawing I have shown my invention embodied in forms which are at present preferred by me.

Figure 1 is a side elevation with a part broken away, showing the decoy as it would appear while floating upon water, and Figure 2 is a cross section through the same on the line 2—2 of Figure 1.

Figure 3 is an elevation, showing the form the decoy assumes, at the time of placing it in the water, and the manner of setting it into the water.

Figure 4 is a bottom plan view of a somewhat modified ballasting arrangement, and Figure 5 is a longitudinal vertical section, illustrating an optional auxiliary flotation means.

The material of which the decoy is formed is of importance to the attainment of the objects in view. Substantially the entire decoy may be formed of rubber, or a similar flexible, impermeable and collapsible material, for by the use of such material the entire decoy may be collapsed and, if necessary, rolled or packed into small compass, and it is also possible to make it quite light when so constructed. Instead of rubber the decoy may be made of rubberized fabric, or similar material, in part or wholly.

The body 1 of the decoy is thus formed as a hollow body of suitable exterior shape and of such collapsible material. A bottom opening, preferably one of considerable horizontal area, admits to its interior. It is immaterial whether the head 2 and tail 3 be incorporated as integral parts of the hollow body or be separate hollow bodies or merely approximate representations of the corresponding parts of the duck. In the preferred form of the decoy the head 2 is hollow, but is separated by a diaphragm 4 from the interior of the body 1, and a drain aperture 5 is provided at the low point of the hollow head, so that no water may remain within the head. The material of the head is sufficiently form-sustaining that when the body 1 is plumped out the head will assume a substantially life-like form and appearance. On the other hand the tail 3 may be formed merely as an extension of the back.

The material of the body is extended downwardly to an appreciable distance below the intended water level, or a separate skirt 6 is secured to the bottom of the body, about its bottom opening, this skirt constituting the downward extension. The skirt is also provided with a large bottom opening 7, which is freely open at all times for entrance of air and water. To hold it open and to insure that it will be open at all times a marginal hoop of suitable character may be employed about the bottom opening 7. Thus for instance within a hem formed by turning upwardly the bottom of the skirt may be supported a hoop consisting of a length of flexible rubber hose 8. This has sufficient inherent stiffness to hold the bottom opening distended at all times, yet it is flexible. In addition the bottom hem or the hose 8 serves as a convenient container for weights 9, for instance small shot, whereby the skirt at its lower edge is weighted and pulled downward into the water. If desired the shot need not completely fill the hose 8, and if the latter extends completely around the bottom opening, then the shot may be adjusted from place to place within the hose, and so distributed as to vary the tilt of the decoy in the water.

Except for an attaching device 10, to which an anchor or tether cord 11 may be secured, this completes the decoy, in its preferred form.

In use the decoy is grasped in the hand of the user, as shown in Figure 3, adjacent the middle of its back, and is lifted. This causes the body 1 to collapse and hang rather limply, with its sides close together. The bottom opening 7, however, is maintained distended and held downward by the hoop 8, which in itself constitutes a weight, and by the additional weights 9, if these are employed. Thus limp and collapsed, the decoy is let down until the bottom opening 7 is submerged, and it may then be released. The result is that a certain amount of air is trapped within the body. The weight at 8 and 9 tends to draw the decoy downward, and this trapped air, pushed upward into the body by the water rising within the skirt 6, plumps out the body 1 and affords it sufficient displacement and buoyancy that the decoy floats.

The size and proportions of the body, the stiffness of its material so as to regulate the degree of limpness, the length of the skirt 6 and the weight at its lower margin, are all so regulated relatively as to afford the proper amount of plumping out and the proper amount of buoyancy to make the decoy float at the proper level, and with the proper stability. Its stability is assured by the low-hung weight at 8 and 9, and further by the downward extent of the skirt 6, and the dead water trapped therein, acting as a keel to maintain stability, even though there be considerable wind or wave action, or both.

When it is desired to pick up the decoy it is only necessary to grasp it as before and to lift it out of the water, whereupon it immediately becomes limp, the trapped air having been released by raising the bottom opening 7 above the water level.

Since such decoys are liable occasionally to be punctured with stray shot, or to become leaky through deterioration or accident, I may in some instances provide an auxiliary flotation device, such as the float 12, secured to the decoy in any suitable means, as by the loose cords 13. I desire to emphasize that the float 12 is not the means by which the decoy is primarily caused to become buoyant. Preferably the cords 13, in the operative position of the decoy and float 12, are limp and loose, so that the float exerts no buoyant effect upon the decoy. However, if the body 1 becomes punctured it will collapse, and the float 12 is so proportioned as to afford sufficient buoyance to prevent the decoy sinking to the bottom, and thus floating, though collapsed, it may be recovered and repaired.

The construction of the decoy lends itself admirably to the repair of leaks. The entire body may be turned inside out, if need be, or in the alternative, all parts of the interior are easily accessible through the bottom opening 7, and a patch may be applied just as in the case of a punctured inner casing of an automobile tire. Such repairs may be accomplished on the duck flats under conditions of use, so that if a decoy is accidentally punctured it may quickly be repaired and again put in service without leaving the marsh.

It has been pointed out how the attitude of the buoyant decoy on the water may be varied by adjusting the shot from place to place within the hose or hoop 8. It may also be adjusted in various other ways. For instance, the weight 14, supplementary to or in substitution for the weight at 9, may be mounted for movement lengthwise of a support 15, which support may be applied at its forked ends 16 to the marginal hoop 8. Thus the weight may be applied or removed as desired, and may be adjusted lengthwise of the duck to vary its attitude while floating on the water.

Such a decoy is truly buoyant and stable. It will not tilt over, but will rise and fall with the waves, as does a live duck. There is practically no possibility of escape of the trapped air through the bottom opening 7, for this opening is so far beneath the surface, and the water rising within the skirt 6 forms so secure a seal, that escape of air from the interior is practically impossible. The entire decoy, being made of collapsible material, may be stored and carried readily, and it is of extremely light weight. It may be made, of course, in the form of other birds, or to simulate any object desired.

What I claim as my invention is:

1. A buoyant decoy comprising a collapsible hollow body of suitable exterior form, open at its bottom, and a weight attached adjacent the bottom of the body, of sufficient mass to hold the open bottom submerged, the decoy being plumped into life-like form, and rendered buoyant, by air trapped within it upon submergence of the bottom opening, under the influence of each weight.

2. A buoyant decoy comprising a hollow collapsible body of suitable exterior form, open at its bottom, a skirt depending below the water line, about such bottom opening, and likewise open at its bottom, and a weight depending from the skirt, the decoy being plumped into life-like form, and rendered buoyant, by air trapped within it upon submergence of the skirt's bottom opening, under the influence of such weight.

3. A buoyant decoy comprising a collapsible hollow body of suitable exterior form, open at its bottom, a weight attached adjacent the bottom of the body, of sufficient mass to hold the open bottom submerged, the decoy being plumped into life-like form, and rendered buoyant, by air trapped within it upon submergence of the bottom opening, and auxiliary flotation means connected to the body to sustain it in the event it is punctured.

4. A buoyant decoy comprising a collapsible hollow body of suitable exterior form, open at its bottom, a weight attached adjacent the bottom of the body, of sufficient mass to hold the open bottom submerged, the decoy being plumped into life-like form, and rendered buoyant, by air trapped within it upon submergence of the bottom opening, and a float connected to the body, and disposed within its bottom opening, of sufficient buoyancy to sustain it if the body is punctured.

5. A buoyant decoy comprising a collapsible hollow body of suitable exterior form, having a bottom opening, a hoop disposed about such opening to keep it open to trap air to plump out and buoy up the body, and a ballasting weight to hold such bottom opening submerged, and the body upright.

6. A buoyant decoy comprising a collapsible hollow body of suitable exterior form, having a bottom opening, a flexible hoop disposed about such opening, and having sufficient stiffness to keep the opening open to trap air to plump out and buoy up the body, and a ballasting weight supported from the lower part of the body to hold the bottom opening submerged and the body upright.

7. A buoyant decoy comprising a collapsible hollow body of suitable exterior form, having a bottom opening, a skirt depending below and about said opening, and itself open at its bottom, a flexible weighted hoop disposed about the skirt's bottom, to maintain such bottom open to trap air to plump out and buoy up the body, and to hold the skirt's opening sufficiently below the water's surface to prevent escape of the air trapped within the body.

8. A buoyant decoy comprising a collapsible hollow body of suitable exterior form, having a bottom opening arranged to be closed by the water in which the decoy is placed, and a weight supported from the lower part of the body to maintain the bottom opening submerged, thereby to trap air to plump out and buoy up the body, the weight being adjustable relative to the body to vary the trim of the body.

9. A buoyant decoy comprising a collapsible hollow body of suitable exterior form, having a bottom opening, and a weight-filled rubber hose supported about the margin of the bottom opening, to hold the opening well below water level, to plump out and buoy up the body by entrapment of air, and to stabilize the buoyant body.

10. A buoyant decoy comprising a hollow body of rubber or like collapsible material impermeable to air and water, of suitable exterior form above the water level, extending well below the water level and having a bottom opening, arranged to be closed by the water in which the decoy is placed, and whereby water rising within the downward extension will trap sufficient air within the body to plump it out and to buoy it up, and a ballasting weight supported from the lower part of the body, the proportions of the body, its downward extension, and the weight being such that the body floats at a natural level and is stabilized by the weight and by water rising within the extension when the decoy, in collapsed condition, is dropped into the water.

11. A buoyant decoy comprising a hollow collapsible body of suitable exterior form, impermeable to air, and open at its bottom for entrance of air to its interior, the center of gravity of the decoy being located sufficiently low that its open bottom is thereby held submerged while it is floating, the decoy being plumped into lifelike form, and rendered buoyant, by air trapped within it as the open bottom is submerged under the influence of the decoy's weight distribution.

12. In a buoyant decoy which comprises a collapsible hollow body of suitable exterior form, having a bottom opening, and which is plumped into life-like form and rendered buoyant by air trapped within it when its bottom opening is submerged, a flexible and inherently distendible hoop disposed about such opening to hold it open automatically for entrapment of air, as the decoy is placed upon the water's surface.

JOSEPH CHESTER FOX.